United States Patent [19]

Firth

[11] Patent Number: 4,566,219

[45] Date of Patent: Jan. 28, 1986

[54] GARDEN PEST BARRIER

[76] Inventor: Milton D. Firth, P.O. Box 464, Dutch Harbor, Ak. 99692

[21] Appl. No.: 624,207

[22] Filed: Jun. 25, 1984

[51] Int. Cl.⁴ .............................................. A01M 1/10
[52] U.S. Cl. ...................................... 43/107; 43/132.1
[58] Field of Search .............. 43/107, 108, 131, 132.1; 256/11, 24, 65, 72

[56] References Cited

U.S. PATENT DOCUMENTS

| | | | |
|---|---|---|---|
| 392,347 | 11/1888 | Krause | 43/107 |
| 395,678 | 1/1889 | Wiebrock | 43/107 |
| 413,507 | 10/1889 | Halstead | 43/107 |
| 981,264 | 1/1911 | Hill | 43/131 X |
| 1,353,073 | 9/1920 | Schivins | 256/72 X |
| 1,373,827 | 4/1921 | Nelson et al. | 43/107 |
| 1,707,230 | 4/1929 | Lowy | 256/65 X |
| 3,108,786 | 10/1963 | Simpson | 256/72 X |
| 3,698,692 | 10/1972 | Burrows | 256/24 X |
| 4,319,423 | 3/1982 | Judd | 43/107 |

Primary Examiner—Nicholas P. Godici
Assistant Examiner—M. Jordan
Attorney, Agent, or Firm—James D. Givnan

[57] ABSTRACT

A barrier for placement about gardens and which includes flanges for the retention of a pesticide along the length of the barrier. A shield portion of the barrier protects the pesticide from water as well as providing an obstacle to the passage of garden pests.

6 Claims, 5 Drawing Figures

U.S. Patent
Jan. 28, 1986
4,566,219
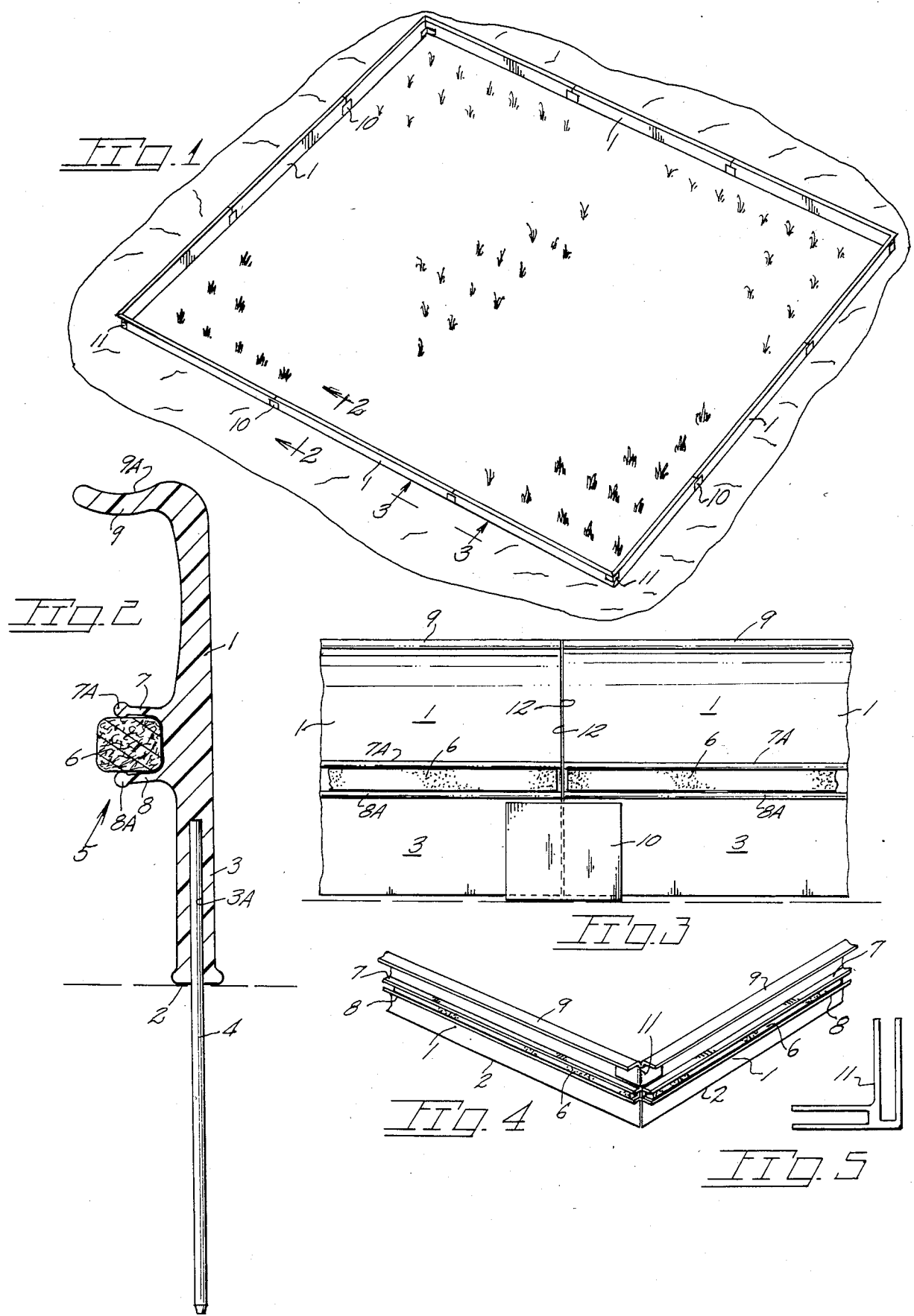

GARDEN PEST BARRIER

BACKGROUND OF THE INVENTION

The present invention pertains generally to devices constituting barriers to plant eating pests such as slugs.

A common problem encountered by those growing flower or vegetable gardens is the slug. While poisoned slug bait is available, the same is quite costly and requires repeated and careful application about the plants. Application of granular slug bait is usually a hit and manner often leaving the plant vulnerable.

The prior art discloses various holders for poisonous or other repellent material but such do not provide a physical barrier to the slug. Examples of repellent holder are found in U.S. Pat. Nos. 4,065,872; 2,825,996; 2,547,314.

SUMMARY OF THE PRESENT INVENTION

The present invention is embodied in a pest barrier which additionally serves to provide a slug repellent.

The barrier is of elongate shape and includes retention means for the repellent. The repellent may be inserted within the retention means to provide a chemical barrier necessarily contacted by the pest as it attempts passage over the barrier. A shield prevents exposure of the insecticide to rain or irrigation water. Clips removably secure adjacent ends of barrier sections.

Important objects of the present pest barrier include the provision of a barrier serving in a dual capacity to provide a physical as well as chemical deterrent to a pest; the provision of a pest barrier lending itself to low cost production methods such as extrusion; the provision of a pest barrier which secures a pesticide body in place to reduce the possibility of removal and human poisoning; the provision of a pest barrier held in place by ground engaging means.

BRIEF DESCRIPTION OF THE DRAWING

In the accompanying drawing:

FIG. 1 is a perspective view of a garden area defined by the present barrier;

FIG. 2 is a vertical sectional view taken along line 2—2 of FIG. 1;

FIG. 3 is an elevational view of the barrier as viewed along line 3—3 of FIG. 1;

FIG. 4 is a perspective view of a corner portion of the pest barrier enclosure; and FIG. 5 is a plan view of the corner connector shown in FIG. 4.

DETAILED DESCRIPTION OF THE PREFERRED EMBODIMENT

With continuing attention to the drawing wherein applied reference numerals indicate parts hereinafter similarly identified, the reference numeral 1 indicates the wall structure of the present barrier in place about an area to be protected from slugs or other garden pests.

As shown in FIG. 2, the wall structure has a bottom edge 2 for ground engagement. A lower portion 3 of the barrier may be adapted to mount projections 4. When such projections are in the form of a spike as shown, the barrier lower portion 3 may be provided at intervals with bores as at 3A for spike reception.

Retention means indicated generally at 5 is offset upwardly from the barrier lower edge and serves to securely retain in place a garden pesticide body 6. Said retention means includes upper and lower horizontal flanges 7 and 8 which are of semi-rigid construction to firmly grasp the pesticide body inserted therebetween to prevent inadvertent extraction or loss. Each flange terminates outwardly in enlarged outer edge 7A–8A which contribute to the protruding securement of the pesticide body to the extent small children are prevented from grasping and removing same.

The barrier includes a shield 9 at its upper extremity of the wall structure which shield is disposed transversely to the main upright portion of the barrier. The shield protects the pesticide from rain and irrigation water. A gutter is at 9A.

With attention to FIGS. 3 through 5, connectors at 10 are shown for joining the barriers to one another with the connector shown being of U-shape, in vertical section, within the bite of which are snugly inserted the lower portions 3 of adjacent barriers. The corner connector at 11, shown in FIGS. 4 and 5, is of right angular configuration in plan view to receive the upper inserted portions of barrier sections disposed perpendicularly to one another. Vertical edges 12 of each barrier abut one another.

The present barrier may be extruded in various lengths of several feet from semi-rigid material such as polyethylene, or other water resistant, economical material having acceptable characteristics which may include flexibility to permit the sections to be installed in other than the linear manner of FIG. 1. If desired, the flanges 7 and 8 and shield 9 may define notched areas to facilitate flexing and installation of the barrier in a curved design.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

I claim:

1. A garden pest barrier comprising,
   a wall structure of elongate shape adapted for rested edgewise placement along a ground surface adjacent a garden,
   means retaining the wall structure in place said wall structure includes a water shield disposed substantially normal to the remaining wall structure and having a lengthwise oriented concave upper surface to serve as a gutter, and
   pesticide retention means including upper and lower horizontal flanges disposed lengthwise along said wall structure and integral therewith, said flanges being spaced from one another and thereby adapted to frictionally receive and retain a pesticide body inserted therebetween.

2. The barrier claimed in claim 1 wherein said flanges are of semi-rigid construction so as to frictionally engage the pesticide body.

3. The barrier claimed in claim 1 wherein said flanges are of a yieldable nature to receive the pesticide body.

4. The barrier claimed in claim 1 wherein said wall structure defines spaced apart bores to receive ground penetrating spikes.

5. The barrier claimed in claim 1 additionally including connectors which define bite areas which receive inserted end portions of adjacent barriers in an abutting manner.

6. The garden pest barrier claimed in claim 1 wherein said flanges terminate outwardly in enlarged edges to contribute to securement of the pesticide body in place.

* * * * *